June 12, 1923.

J. DE GLOPPER 1,458,132

METAL AND EYE MEMBER CONNECTION

Filed March 7, 1922

Inventor
John De Glopper
By Frank E. Lucrance, Jr.
Attorney.

Patented June 12, 1923.

1,458,132

UNITED STATES PATENT OFFICE.

JOHN DE GLOPPER, OF HOLLAND, MICHIGAN, ASSIGNOR TO FEDERAL STAMPING COMPANY, OF HOLLAND, MICHIGAN, A CORPORATION OF MICHIGAN.

METAL AND EYE MEMBER CONNECTION.

Application filed March 7, 1922. Serial No. 541,880.

*To all whom it may concern:*

Be it known that I, JOHN DE GLOPPER, a citizen of the United States of America, residing at Holland, in the county of Ottawa and State of Michigan, have invented certain new and useful Improvements in Metal and Eye Member Connections; and I do hereby declare the following to be a full, clear, and exact description of the invention, such as will enable others skilled in the art to which it appertains to make and use the same.

This invention relates to a novel connecting construction whereby a screw eye, eye bolt or like member may be permanently connected to a sheet metal construction, the shank of said member being adapted to be inserted into or otherwise connected with any suitable support for carrying and supporting the entire construction. One place where such invention is of utility is in connection with pulleys, the said member, such as the screw eye or the like being connected with the pulley housing at one end thereof so that the shank projects from the housing and may be readily attached to a suitable support. It is a primary object and purpose of the invention to make a connecting construction of this kind, adapted for use in many relations, one which is very simple and economical in structure, can be produced in quantity, and is durable and efficient in use. Other objects and purposes than those described will appear as understanding of the invention is had from the following description, taken in connection with the accompanying drawing, in which, Fig. 1 is a perspective view of a pulley housing and screw eye separated, the ends of the housing being separated and shown as shaped to receive the eye of the screw eye.

Like reference characters refer to like parts in the different figures of the drawing.

Figure 1:
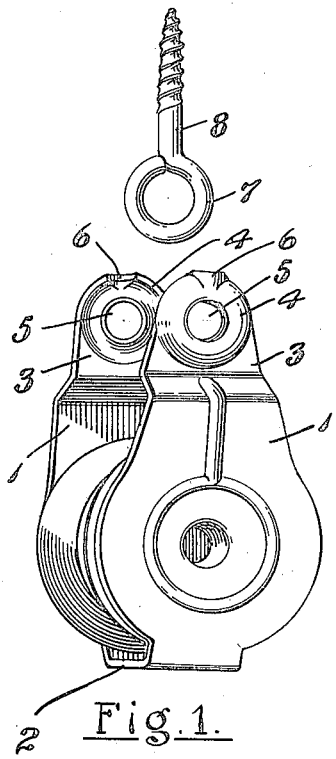
Figure 2:
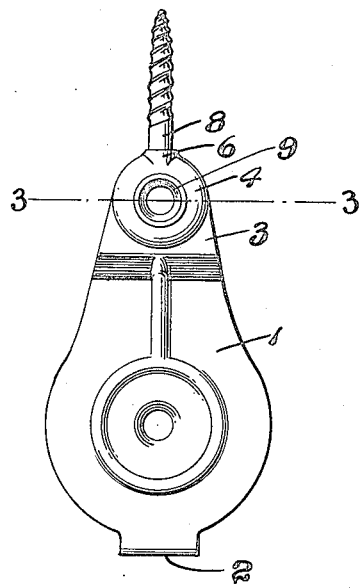
Fig. 2 is a side elevation of the completed and assembled pulley.
Figure 3:
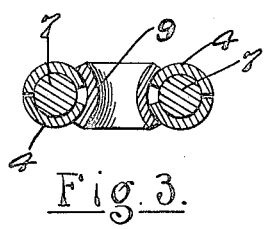
Fig. 3 is an enlarged horizontal section taken on the plane of line 3—3, of Fig. 2.

The invention is shown in connection with a sheet metal pulley housing, in which a single piece of sheet metal is used, comprising two parallel sides 1 connected at their lower ends by a cross member 2 and having ends 3 at the upper ends of the sides 1 which are bent toward each other as shown, thus making a housing in which the pulley may be mounted. The ends 3 lie alongside of each other and each is pressed so as to make a circular embossing 4 around an opening 5 in each ear, the concavities or recesses being on the inner adjacent sides of said end portions 3. At the upper portion of each embossing 4, a part 6 is pressed outwardly into substantially semi-circular form so that when the two ends 3 are brought together a circular opening is left at the extreme upper end of the housing for the passage of the shank of the screw eye or like member which is connected with the housing, as will later appear.

In the construction shown, a screw eye having a circular eye 7 and a shank 8 projecting therefrom, or like member equipped with a screw eye portion, is designed to be attached to the upper end of the housing, the eye portion 7 fitting the concaved depressions or recesses at the embossings 4 on the inner sides of the ends 3 when the said ends are brought together against the eye, while the shank 8 extends outwardly through the opening made by the outwardly pressed portions 6, as is evident. The parts are permanently connected together by passing a short section 9 of tubing through the openings 5 and through the opening in the eye portion 7, thereafter spreading the part 9 at both ends. It is evident that the part 9 serves as a tubular rivet enlarged at both ends so as to make a secure and permanent tie which secures the ends of the housing together and at the same time permanently secures the screw eye to the housing. The outer portion of the shank 8 is formed with threads so that the same may be inserted into a support, such as a window casing where the pulley is to be used for carrying awning ropes, or other suitable support wherever the pulley is to be used for whatever purpose. It is further apparent that the screw means of attachment is not essential, and the invention is to be considered as comprehending any suitable means of connecting the shank to a support.

This construction for permanently connecting screw eyes, screw bolts or the like to and between sheet metal parts is very simple and economical to manufacture. While the invention is shown and has great utility with pulleys, it is not to be considered as limited thereto, it being applicable in a great many other relations. The appended claims define the invention, and its scope is limited only as defined by said claims.

I claim:

1. In combination, two pieces of sheet metal located side by side and formed each with an opening therethrough and with a circular outwardly pressed embossing around the opening, said embossing at one side being pressed into a radially extending portion of relatively small diameter, a member having a circular eye and a projecting shank, said eye being located between the sheet metal pieces and received in the recesses made by said embossings and the shank extending outwardly through the opening left by said radial embossings, and a tubular member passing through the openings in the sheet metal pieces and the eye and having its ends enlarged to make a permanent connection of the pieces and eye, substantially as described.

2. In combination, two sheet metal members located side by side and formed each with an opening therethrough and with an outwardly pressed embossing around each opening, a member having an eye portion and a shank projecting therefrom, said eye portion being located between the sheet metal members and housed in the recesses on the inner adjacent sides thereof formed by said embossings with the shank extending outwardly beyond said sheet metal members, and means passing through the openings in said sheet metal members and the eye for permanently connecting the sheet metal members and eye together.

3. In combination, two sheet metal members located side by side, a third member having an eye portion and an outwardly extending shank, the eye portion being located between the sheet metal members and said members having recesses to receive opposite sides of the eye portion and permit the outward extension of the shank, and means passing through the sheet metal members and eye portion of the third member to permanently secure all of the members together.

4. A pulley housing having opposite sides and ears bent toward each other at the upper ends of said sides to lie in substantial contact with each other, a member having a circular eye portion located between the ears and wholly covered thereby and means permanently connecting said ears and member together.

5. A pulley housing having opposite sides with ears at the upper ends thereof bent toward each other to lie in substantial contact, a member having an eye portion located between the ears and a shank extending outwardly beyond said ears, said ears being shaped to completely enclose the eye portion, and means passing through the ears and eye portion to permanently connect the same together.

In testimony whereof I affix my signature.

JOHN DE GLOPPER.